Dec. 3, 1968  G. GARETTO ET AL  3,414,640
METHOD OF PRECIPITATING AND FORMING GRANULES
FROM CELLULOSE ESTERS
Filed Oct. 21, 1965
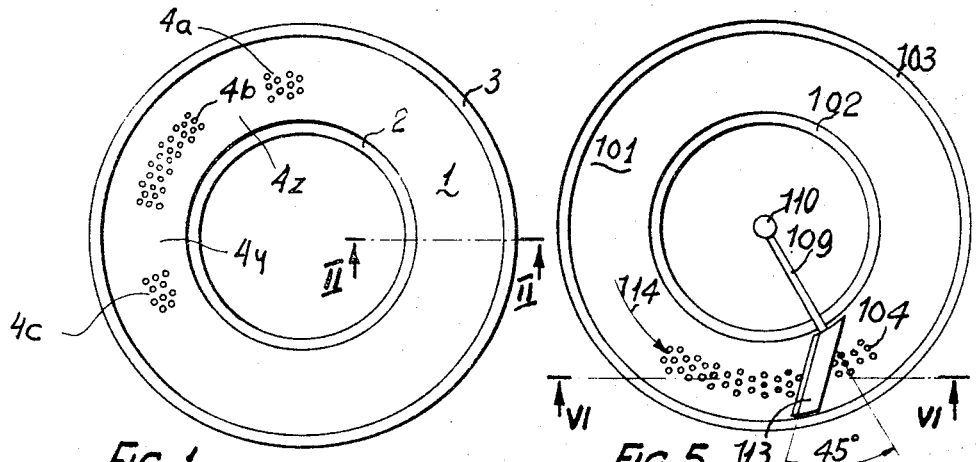
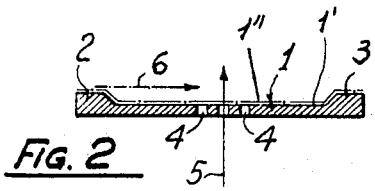
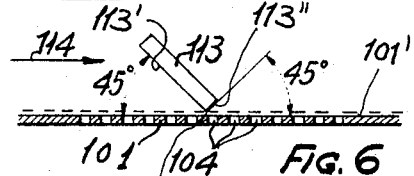
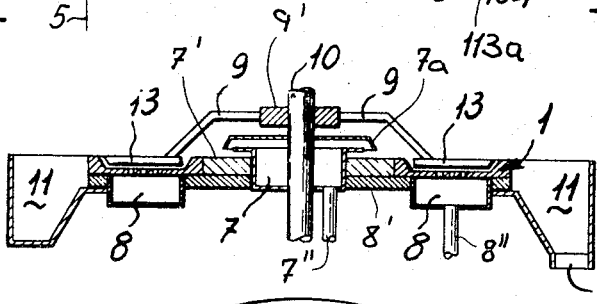
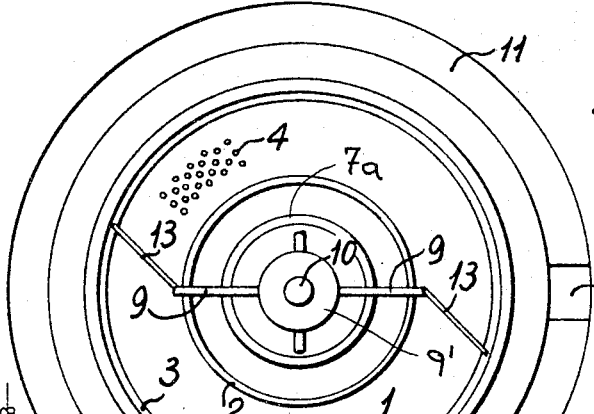
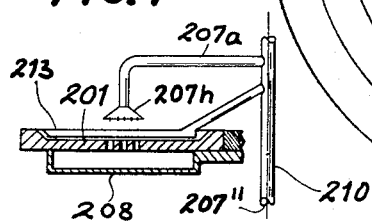
INVENTORS:
Clemente Canciani
Giuseppe Garetto
BY Karl F. Ross
Attorney

3,414,640
METHOD OF PRECIPITATING AND FORMING GRANULES FROM CELLULOSE ESTERS

Giuseppe Garetto, Verbania, Novara, and Clemente Canciani, Susello-Ghiffa, Novara, Italy, assignors to Rhodiatoce S.p.A., Milan, Italy, an Italian corporation
Filed Oct. 21, 1965, Ser. No. 499,134
Claims priority, application Italy, Feb. 18, 1965, 1,420
6 Claims. (Cl. 264—13)

ABSTRACT OF THE DISCLOSURE

A method for the continuous precipitation of cellulose alkylate esters and the production of granules thereof, in which the cellulose alkylate solution is fed upwardly through a perforated surface upon which is disposed a thin film of the precipitating liquid and the surface is swept by a blade to sever the coagulated granules as they form on the perforated surfaces.

---

Our present invention relates to the continuous precipitation of cellulose alkylates from solutions thereof and, more particularly, to an improved method for the continuous precipitation of such products.

The term "cellulose alkylate" is used herein to denote the lower-alkyl acid esters of cellulose and especially esters of cellulose whose alkylate groups have between 1 and 4 carbon atoms in the chain. Such alkylates include cellulosic acetates (i.e., cellulose mono-, di- or tri-acetate and mixtures thereof) as well as cellulose esters of propionic acid and butyric acid (i.e., cellulose butyrate and cellulose propinate); the term also includes those products of alkylation (e.g., acetylation) using the acid anhydride, such as cellulose acetate formate (cellulose acetoformate), cellulose acetate propionate (cellulose acetopropionate) and cellulose acetate butyrate (cellulose acetobutyrate). The formation of cellulose esters of the lower-alkyl acids has become widespread practice and finds its most significant application in the so-called "acetate process" in which cellulose is treated with acetic acid, acetic anhydride and, usually, a sulfuric-acid catalyst to acetylate the cellulose to a greater or lesser extent. The cellulose can contain on an average one, two or three acetate groups per glucose structure thereof, although commercially produced cellulose-acetate solutions are partially hydrolyzed so that the product contains between about 200 and 300 glucose units per chain and the average number of acetate groups is 2 to 2.5 per glucose unit. The cellulose acetate can be obtained from the process in the solution of acetic acid in which it was made or as a solution in acetone in which it is highly soluble. Similarly, cellulose propionate can be present in the corresponding alkylic acid or in solution in some other solvent. Cellulose acetate butyrate is generally produced by the reaction of cellulose with acetic and butyric anhydrides in glacial acetic acid as the solvent, while cellulose acetopropionate is produced in a similar manner with propionic anhydride. The remaining compounds mentioned above are, of course, of correspondng derivation. Acetone can frequently be used as a solvent medium for the ester.

It is known that the cellulose esters can be precipitated from its solution by evaporation of the solvent, e.g., by passing the solution through the apertures of a spinneret into contact with air at a temperature above the boiling point of the solvent, or by introducing the solution into a bath of a liquid in which the cellulose ester is less soluble. The original solvent can be either the medium in which the cellulose ester was prepared or some other medium in which it is soluble and the solutions may have been subjected to dilution or concentration or otherwise modified. It has, for example been proposed to cast the cellulose-ester solution into water and thereby precipitate the solid ester. Aside from water, other precipitants have been suggested including dilute organic acids for the corresponding esters, ethyl ether and hydrocarbon mixtures. In general, these conventional processes yield a product which is more or less nonuniform and requires a relatively large quantity of the precipitant, thereby resulting in a substantial dilution of the solvent serving as the vehicle for the cellulose ester. Economical recovery of the solvent from highly dilute solutions is difficult if not impossible.

In the case of cellulose acetate, for example, it has been the practice to precipitate the ester from a 15% by weight solution thereof in aqueous acetic acid containing about 90% by weight acetic acid. The precipitant was a 10% by weight aqueous solution of acetic acid and the concentration of acetic acid after precipitation was approximately 31% by weight. The inconvenience in handling this relatively dilute solution and the inability to reuse it presents obvious difficulties with regard to the economics of the process. It has not, to our knowledge, been possible heretofore to provide a system for precipitating cellulose esters from their solution while recovering a liquid having a high concentration of the original solvent.

It is, therefore, an important object of the present invention to provide a method for the precipitation of cellulose esters and the formation of granules thereof from solutions which will permit practically quantitative recovery of the solvent at elevated concentrations thereof without complex concentration steps.

A further object of this invention is to provide a method for precipitating cellulose esters and especially cellulose acetate, cellulose propionate, cellulose butyrate, cellulose acetoformate, cellulose acetopropionate and cellulose acetobutyrate, which are capable of producing a solid product of a bulk and configuration suitable for washing and subsequent use and of a uniform particle size.

Still another object of this invention is to provide a method for the precipitation of cellulose esters of the character described from their solutions in the medium in which they were made or other media, which process is continuous, relatively simple and is capable of producing an exceptionally high yield of cellulose ester per unit weight or volume of the precipitant.

We have discovered that the aforementioned objects can be attained by the use of a precipitant in a relatively thin film overlying a surface, the method comprising the steps of passing a solution of the cellulose ester through at least one aperture in a surface, disposing on the surface a thin film of a precipitating liquid to solidify the cellulose ester as it emerges from the aperture through the film and periodically removing the emergent cellulose ester from the region of the aperture. According to these method aspects of the present invention, the surface is generally flat and substantially horizontal while having an upper surface overlain by the film of precipitating liquid, and the solution is forced through apertures in the surface from below.

According to another aspect of this invention, the surface is substantially stationary and cooperates with a movable cutting blade sweeping periodically along the surface and severing pellets or granules of the ester as they emerge from the apertures. We have found that the use of a thin film of precipitating liquid in this manner consumes a quantity of precipitant which can be less than one fifth by weight of the quantity of solution to be precipitated. This latter solution is thus diluted only by about one fifth and can be considered to be recoverable with its concentration substantially unchanged from the point of view of industrial processes. The product is obtained in the form of pellets, granules or beads of a uniform size and shape, the mass of the granules being readily subjected to subsequent drying and washing operations.

According to a feature of the apparatus aspects of this invention, the surface is constituted by a generally flat, horizontal fixed nozzle of angular configuration having an array of apertures, means below the nozzle plate for supplying the cellulose-ester solution from below to the apertures and forcing the solution therethrough; blade means rotatable about the axis of the nozzle for periodically sweeping over the apertures and cutting loose the precipitated granules of cellulose ester, and means for collecting the granules.

According to a more specific feature of this invention, feed means are provided along the inner rim of the plate and annular nozzle for flowing the film precipitating liquid across the surface of the nozzle while collecting means, e.g., in the form of a trough surrounding the annulus, collects the particles of precipitated cellulose ester to this trough. If the blade means extend generally tangentially to a circle centered on the axis of rotation and inclined inwardly in the sense of rotation, the blade means can also serve to deflect the particles outwardly into the trough. According to a still more specific feature of this invention, the means for supplying the cellulose-ester solution to the apertures includes an annular or toroidal duct disposed below the plate and communicating with the apertures. Alternatively, it is possible to provide means with less volume, but displaceable in the sense of rotation of the blade means and preferably trailed by one of the blades for feeding the precipitating liquid on the surface of the nozzle just as the blade shears previously precipitated particles during its traverse of the plate.

Other objects, features and advantages of the present invention will become more readily apparent from the following description and specific examples, reference being made to the accompanying drawing in which:

FIG. 1 is a plan view of a horizontal precipitating nozzle, according to the invention;

FIG. 2 is a vertical cross-sectional view taken generally along the line II—II of FIG. 1;

FIG. 3 is an axial cross-sectional view through the apparatus showing a blade means cooperating with the surface;

FIG. 4 is a plan view of the apparatus of FIG. 3;

FIG. 5 is a plan view similar to FIG. 1 but showing a modification of the invention;

FIG. 6 is a cross-sectional view taken generally along the line VI—VI of FIG. 5 and illustrating a highly advantageous construction of the blade means; and FIG. 7 is a fragmentary cross-sectional view generally similar to FIG. 3 and illustrating still another modification of the nozzle and the structure cooperating therewith.

In FIG. 1, we show a plan view of a horizontal nozzle 1 whose flat surface 1′ is adapted to receive a layer 1″ (dot-dash lines in FIG. 2) of the precipitant. The surface 1′ is provided with a plurality of angularly spaced arrays 4a, 4b, 4c, etc., of apertures 4 having vertical axes perpendicular to the surface 1′. The arrays 4a, 4b, 4c, etc., extend along circular sectors and are spaced apart by imperforate sectors 4z, 4y, etc., constituting zones free from apertures. The surface 1′ is, moreover, flanked by an inner rim 2 and an outer rim 3, the liquid film 1″ being fed to the apparatus over the inner rim 2 and passing therefrom over the rim 3. The bores 4 are preferably spaced apart at the distance of their closest approach by about 4 mm. and have a diameter of about 2 mm. Arrow 5 represents the direction of flow of cellulose-ester solution while arrow 6 represents the direction of flow of the precipitating liquid. The inner and outer rims 2 and 3 impart to the nozzle the configuration of a toroidal trough of broad and shallow cross-section.

The nozzle of FIGS. 1 and 2 can be incorporated in the assembly illustrated in FIGS. 3 and 4 and, for this purpose, is mounted upon a platform 8′ carrying an upwardly open generally toroidal trough 8 constituting the supply means for feeding the cellulose-ester solution upwardly (arrows 5) through the bores 4. A pipe 8″ feeds the solution to the toroidal trough 8. The mouth of trough 8 registers with the web portion of the nozzle 1 and, therefore, with the apertures 4 thereof. A toroidal collecting trough 11 surrounds the nozzle 1 outwardly thereof and is affixed to the platform 8′, thereby serving to receive the precipitant liquid flowing from the nozzle over its outer rim 3. The trough has one or more outlets 12 at which the precipitant liquid and the particles of cellulose ester are removed. Along the inner rim 2 of the nozzle 1, we provide a spacer ring 7′ which is overlain by a horizontal flange of a cup-shaped apron 7 to which the precipitant is supplied by a pipe 7″. An annular shield 7a overlies this apron and directs the precipitating liquid substantially uniformly onto and over the inner rim 2 to form the film.

A plurality of angularly spaced blades 13 (two of which are broken away in FIG. 4) are rigidly mounted upon respective arms 9 secured to a hub 9′ carried by a shaft 10 extending axially through the apparatus and rotating at a constant speed. The blades 13 are inclined inwardly in the direction of rotation (arrow 14) of the shaft 10 so that they deflect the particles severed at the apertures toward the trough or gutter 11. As the cellulose acetate or other solution passes through the bores 4, it contacts the precipitant 1″ and solidifies while protruding through the apertures by a distance determined by the rate of flow of the solution and the rate of rotation of the shaft. These protruding portions are severed and carried away. The number of granules provided during each sweep of each blade is, of course, equal to the number of holes in the nozzle, assuming that the rate of flow of the solution is maintained constant for all of the holes. The granules are swept over the rim 3 while suspended in the precipitant.

In FIGS. 5 and 6, we show a modified arrangement wherein the nozzle 101 is provided with a single annular array of holes 104 flanked by the rims 102 and 103. The shaft 110 here carries an arm 109 whose blade 113 is inclined at a 45° angle with respect to the radius along which the arm 109 extends. The blade 113 is rotated in the counterclockwise sense (arrow 114). We have found that best results are obtained when the blade, as shown in FIG. 6, has a broad surface 113′ including an angle of 45° with the surface 101′ of the nozzle plate 101 and a narrow face 113″ including an angle of 45° with this surface. The cutting edge 113a is formed as the intersection of the broad face 113′ and the narrow face 113″. In FIG. 7, we show a modified arrangement for feeding the precipitant to the nozzle 201. The shaft 210 can be tubular for this purpose and carries not only the blades 213 but also the tube 207a, the lower end of which comprises a distributor 207h. The precipitant is fed through the conduit 207″, tube 207a and a distributor 207b in a thin film over the nozzle 201 just before the passage of the blades 213″. The ester solution is fed upwardly through trough 208.

The cellulose-ester solution in acetone, acetic acid or other organic acid is pumped continuously into the toroidal channel 8 and escapes through the apertures 4, 104 etc. in the form of liquid jets. The precipitant is supplied constantly by gravity or by pumping and lies along the surface 1′, 101′ in a thin film which contacts the liquid jets emerging from the nozzles. Substantially simultaneously or after momentary congealing, the fluid jets are cut at the nozzle. When the severing is carried out immediately after extrusion, the granules are found to be in a semisolid state whereby surface-tension phenomena tend to round them and impart a generally spherical configuration to the granules. The granules, of a uniform particle size determined by the apertures, are continuously collected at the outlets of the gutter 11.

If a constant quantity of precipitant and of cellulose-ester solution is supplied per unit time and if the rate of rotation of the cutter is constant, granules of equal and constant shape and size will be obtained. The solid product, separated and collected after precipitation is also of a shape and size making it particularly suitable for the subsequent washing operation. The liquid remaining from the precipitation has a constant and very high acid content and thus the operation of recovering the acid itself from its solution is simplified. In the case of precipitation of cellulose acetate, the liquid remaining from the precipitation has a concentration of acid of over 60% by weight and recovery in the form of glacial acetic acid can be effected directly by distillation in an economically advantageous manner.

Example I

A cellulose-acetate solution having a viscosity of 120 poise at a temperature of 50° C., consisting of 12 parts by weight of cellulose acetate of acetic-acid titer (yield) of 61.0% and 88 parts by weight of 90% by weight acetic-acid solution (90 parts acetic acid and 10 parts water) is pumped into an apparatus of the form hereinbefore described. Simultaneously through the feed means 7, a 4% by weight aqueous solution of acetic acid at a temperature of 15° C. is fed by gravity through a nozzle. Simultaneously, the shaft controlling the rotation of the blades is set in motion. The nozzle has an inner diameter of about 30 centimeters and an outer diameter of about 45 centimeters and contains 4000 holes of 2 mm. bore with a 4 mm. spacing. The apparatus is equipped with four cutters which rotate at a rate of 200 r.p.m. The cellulose acetate solution is fed at a rate of 3600 liters/hour. The 4% acetic acid solution is fed at a rate of 1200 liters/hour. At the outlet of the apparatus, a suspension is obtained consisting of the cellulose acetate precipiated in granules suspended in the acid remaining from the precipitation. When, by a simple migration process, precipitation even of the inner portion of the granules is completed the precipitation liquid consists of 70% by weight acetic acid (70 parts acetic acid and 30 parts water). The precipitation liquid can be separated from the cellulose acetate for the recovery of the acetic acid, while the cellulose acetate, which is in the form of hard, uniform granules, can easily be washed, using known methods.

Example II

A 17% by weight cellulose acetate solution, having an acetic-acid titer (yield) of 55%, in a 89% by weight solution of acetic acid (11 parts water and 89 parts acetic acid) is pumped at a pressure of 1.5 kg. per square centimeter, at a temperature of 65° C. and with a viscosity of 100 poise into an apparatus corresponding to that hereinbefore described. Acetic acid in a 3% by weight solution (3 parts acetic acid and 97 parts water) is pumped into the same apparatus at a temperature of 5° C. Thus the precipitative liquid can consist of aqueous acetic acid while the cellulose ester is a cellulose acetate having acetic acid titer of at least 50%. Simultaneously the cutter device in the apparatus, consisting of four cutters set mutually at right angles, is started. The cellulose acetate solution is fed continuously at a rate of 5000 liters/hour and the 3% acetic acid solution at a rate of 1000 liters/hour. The nozzle contains 7000 holes of 2 mm. bore, spaced at 4 mm. between centers. The holes are arranged in a circular ring having an inner diameter of about 43 centimeters and an outer diameter of about 60 centimeters. The blades are fixed on a shaft rotating at a rate of 150 r.p.m. The cellulose acetate precipitated in the form of uniform granules, suspended in a precipitation liquor consisting of 74% by weight acetic acid (74 parts acetic acid and 26 parts water) is collected continuously at the outlet of the apparatus. The cellulose acetate, separated from the precipitation liquor can easily be washed by known methods, while the precipitation liquor can be passed into a distillation column for direct recovery of the glacial acetic acid. After washing and drying, the cellulose acetate is in the form of granules, the grain size of which is such that it passes 100% through a sieve with a 2 mm. mesh but is retained by a screen of 1 mm. mesh.

The process has been found to be susceptible to large-scale production.

The invention described and illustrated is believed to admit of many modifications within the ability of persons skilled in the art, al such modifications being considered within the spirit and scope of the appended claims:

We claim:

1. A method of precipitating and forming granules from a solution of cellulose ester by the interaction with a precipitating liquid, comprising the steps of:
    (a) forming a flowing film of said precipitating liquid over an upper surface of a generally horizontal member,
    (b) flowing said ester solution upwardly from below said member through at least one aperture in said member to said surface to contact said precipitating liquid to coagulate and solidify said ester solution, and
    (c) severing said solidified ester solution adjacent said surface, to thereby form granules of said ester.

2. The method defined in claim 1 wherein said severing is done with a blade swept over said surface periodically to produce, from said solidified ester, a multiplicity of granules of substantially constant size and configuration.

3. The method defined in claim 1 wherein said cellulose ester is a cellulose acetate and said solution is the medium in which said cellulose acetate was produced from an acetylation of cellulose.

4. The method defined in claim 1 wherein said solution consists predominantly of a solvent selected from the group which consists of acetic acid and acetone.

5. The method defined in claim 1 wherein said precipitating liquid consists predominantly of at least one compound selected from the group consisting of water, ethyl ether and hydrocarbons.

6. The method defined in claim 1 wherein said precipitative liquid consists of dilute aqueous acetic acid, and the cellulose ester is a cellulose acetate having an acetic acid titer of at least 50%.

References Cited

UNITED STATES PATENTS

| 2,356,599 | 8/1944 | Landgraf | 264—11 |
| 2,543,928 | 3/1951 | O'Neill et al. | 264—13 |
| 3,042,970 | 7/1962 | Terenzi | 264—11 |

ROBERT F. WHITE, *Primary Examiner.*

J. R. HALL, *Assistant Examiner.*